United States Patent [19]

Benjamin et al.

[11] 4,290,206
[45] Sep. 22, 1981

[54] TOOL PRESETTING FIXTURE

[75] Inventors: Milton L. Benjamin, Moreland Hills; Wilbur N. Miles, Chagrin Falls; Edward A. Majkrzak, Newburgh Heights, all of Ohio

[73] Assignee: Erickson Tool Company, Solon, Ohio

[21] Appl. No.: 82,771

[22] Filed: Oct. 9, 1979

[51] Int. Cl.³ .................. B23B 49/00; G01B 5/02
[52] U.S. Cl. .................................. 33/185 R; 33/201
[58] Field of Search ............ 33/185 R, 180 R, 181 R, 33/201

[56] References Cited

U.S. PATENT DOCUMENTS 3,504,442 4/1970 Allen .
3,518,769 7/1970 Bullard et al. .
3,546,781 12/1970 Cox et al. .

Primary Examiner—William D. Martin, Jr.
Attorney, Agent, or Firm—Pearne, Gordon, Sessions, McCoy & Granger

[57] ABSTRACT

A tool presetting fixture is disclosed for use with cross-slide type tool holders which are usable on a multiple spindle automatic machine tool. The tool holder has a tool holding pocket to hold a cross-slide type tool with a tool tip. The fixture has a base with a first gage surface mounted for movement parallel to the base to gage the spindle centerline height of a tool tip in the tool holding pocket. The fixture also has a rear wall on the base which has a second gage surface perpendicular to the base. Gage means is provided to gage the distance from this second gage surface to the tool tip and screws are provided in the tool holder and acting on this second gage surface to obtain a gaged distance of the tool tip from a reference surface of the machine tool to establish a predetermined longitudinal dimension on the workpiece. Further a side wall on the fixture provides a third gage surface perpendicular to the base and also perpendicular to the second gage surface and this permits gaging the distance of the tool tip to this third gage surface to gage the workpiece cutting radius. The foregoing abstract is merely a resume of one general application, is not a complete discussion of all principles of operation or applications, and is not to be construed as a limitation on the scope of the claimed subject matter.

15 Claims, 9 Drawing Figures

TOOL PRESETTING FIXTURE

BACKGROUND OF THE INVENTION

Tool presetting fixtures have previously been used on such machine tools as boring machines, milling machines, and machining centers which are equipped with automatic controls, for example, numerical control by a tape. Such preset fixtures may be as is shown in U.S. Pat. No. 3,518,769. Multiple spindle machines, however, are older than such numerical control machining centers, yet typically have been used for long part-runs of one million or more parts, for example. Because of such long part-runs, it previously has not been considered essential that a quick setup time for a new workpiece was essential. Accordingly, the setup time for a new workpiece might be one to two days. However, in companies with short runs, it is often necessary to shorten the setup time of a multiple spindle machine tool because shorter runs of production parts mean that the setup time is a greater proportion of the total time for that production job.

It was previously known to utilize a presetting fixture which was of an L-shape for gaging two different perpendicular dimensions of a tool tip, for example, as shown in U.S. Pat. No. 3,546,781. Also, different gage fixtures have been proposed where a swinging arm was used as in U.S. Pat. No. 3,504,442; however, this was only for the purpose of accommodating different diameter tools in different diameter sockets.

Accordingly, the problem to be solved is how to provide a tool presetting fixture for use in a multiple spindle automatic machine tool, wherein three different mutually perpendicular dimensions may be gaged of a tool tip on a tool in the tool holder. Further, the problem to be solved is how to gage the dimension of the tool tip relative to the centerline of the workpiece.

SUMMARY OF THE INVENTION

This problem is solved by providing a tool presetting fixture with three mutually perpendicular gage surfaces. It is further solved by providing a swinging arm to gage the dimension of the tool tip to be on the centerline of the workpiece. The fixture may be established as a three-sided box shape for gaging three dimensions and may also be established as a four-sided box shape, namely, a bottom and three sides, to permit gaging for upside-down tools as well as right-side-up tools.

The problem is solved by a tool presetting fixture for cross-slide type tool holders usable on a multiple spindle automatic machine tool, comprising in combination, a base, means to secure to said base a tool holder for cross-slide type tools having a tool holding pocket on an end thereof, said tool holding pocket adapted to mount a tool having a tool tip, a first gage surface mounted on said base for movement parallel to said base to gage the spindle centerline height of a tool tip in the tool holding pocket on the tool holder, a wall carried on said base and having a second gage surface perpendicular to said base, said second gage surface permitting gaging the distance of the tool tip from said second gage surface, and a third gage surface carried on said base perpendicular to said base and perpendicular to said second gage surface to permit gaging the distance from the tip of the tool to said third gage surface to gage for the workpiece cutting radius of the tool tip on a workpiece in the respective machine spindle.

An object of the invention is to provide a tool presetting fixture which gages three mutually perpendicular dimensions to a tool tip.

Another object of the invention is to provide a tool presetting fixture in the form of a four-sided box to provide one group of three mutually perpendicular gage surfaces or another group of three mutually perpendicular gage surfaces.

Another object of the invention is to provide a tool presetting fixture primarily for use with tool holders for multiple spindle automatic machine tools.

Other objects and a fuller understanding of the invention may be had by referring to the following description and claims, taken in conjunction with the accompanying drawing.

DESCRIPTION OF THE PREFERRED EMBODIMENT

Figure 1:
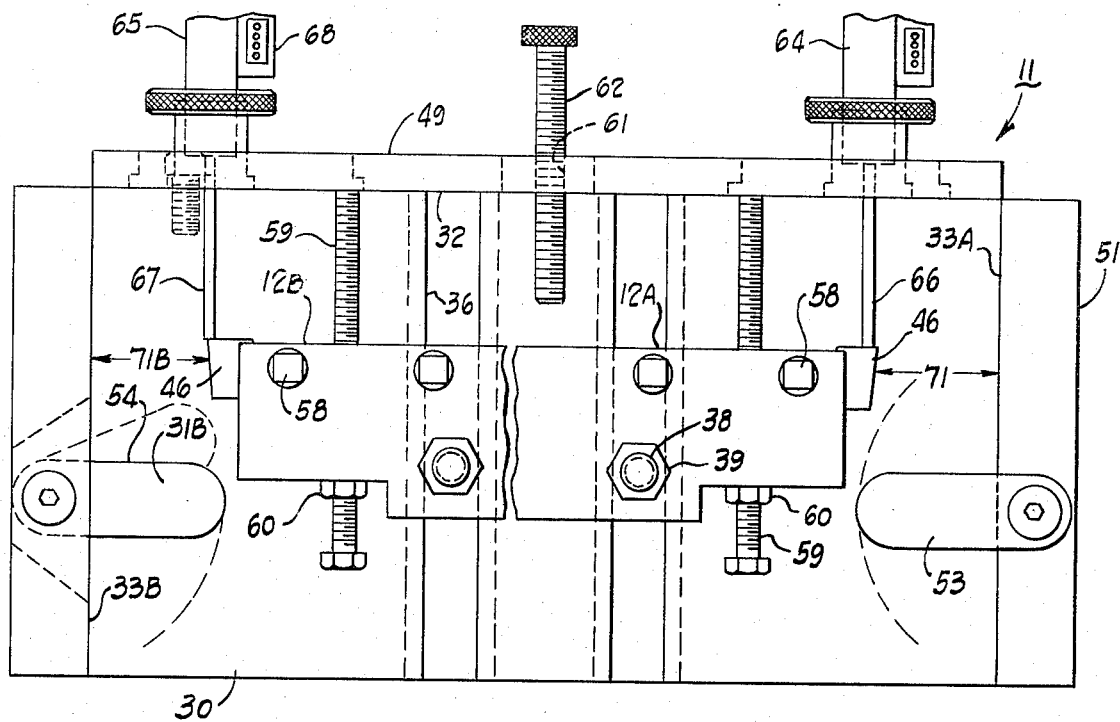
FIG. 1 is a plan view of a tool presetting fixture of the invention.
Figure 2:
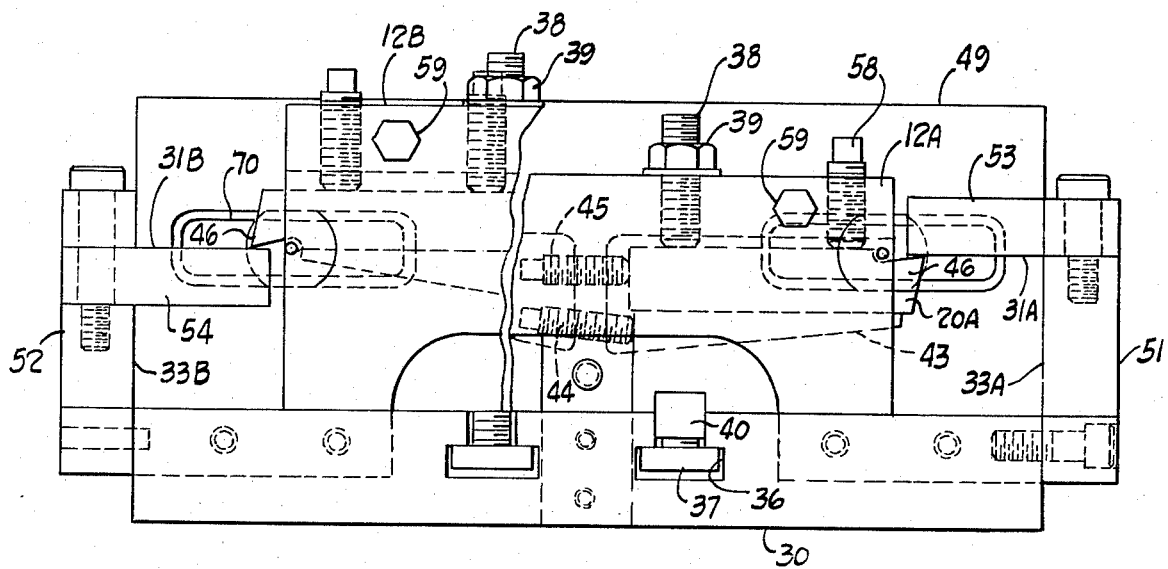
FIG. 2 is a front elevational view of the fixture.
Figure 3:
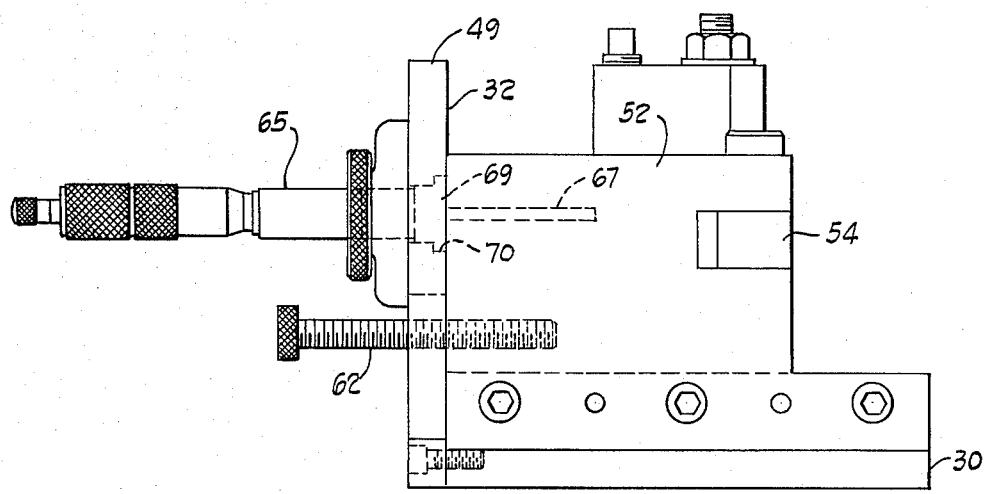
FIG. 3 is an end elevational view of the fixture.

FIGS. 1, 2 and 3 illustrate a tool presetting fixture 11 for cross-slide type tool holders 12A or 12B. Such tool holders are usable on a multiple spindle automatic machine tool 13, such as is partially shown in FIG. 4. Such machine tools are provided with an indexable spindle carrier 14 journaling a plurality of rotatable spindles 15 and which extend from a spindle carrier face 16 which may be considered a reference surface from which the length of a workpiece 17 may be gaged.

Figure 4:
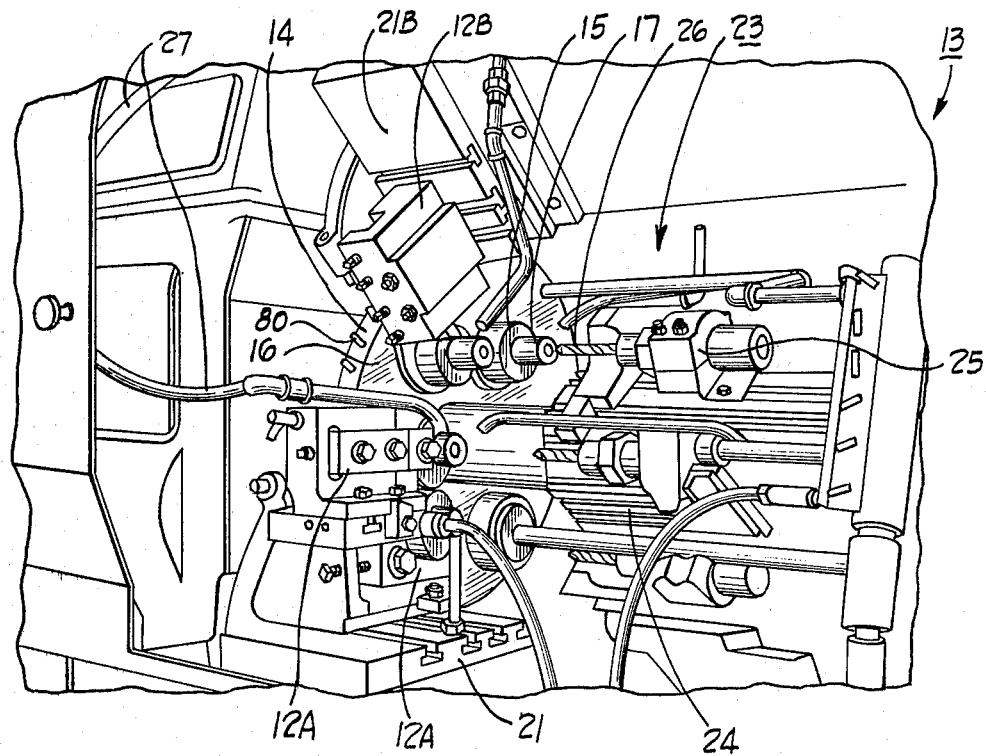
FIG. 4 is a perspective view of a multiple spindle automatic machine tool on which the tool holders may be utilized.

FIG. 4 shows two tool holders 12A for right-side-up tools 20a and a tool holder 12B for an upside-down tool 20b. Each of these tool holders is mounted on a cross-slide 21 with the cross-slide provided with T-slots to receive T-headed bolts for securing the tool holders to the cross-slides. FIG. 4 also shows the general complexity and closeness of the many tools and tool holders in the tooling area 23 with an end tool slide 24 in this tooling area also carrying end tool holders 25 with tools 26 for working on the workpieces in the various spindles 15. Also shown are coolant conduits 27 and the closeness of the various machine elements shows the difficulty of trying to adjust the position of a tool tip in three mutually perpendicular directions with the tool and tool holder on the machine tool 13.

Figure 5:
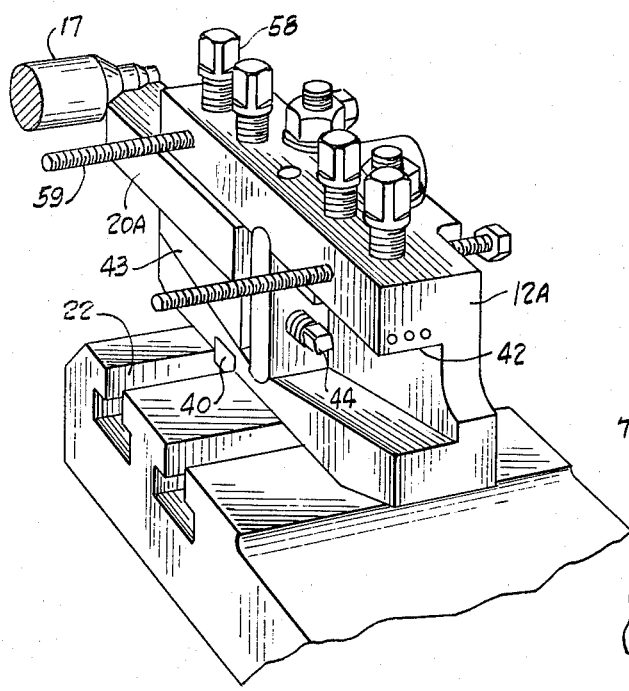
FIG. 5 is a perspective view of a gaged tool holder mounted on a right-side-up cross-slide.

FIG. 5 illustrates a tool holder 12A for use with a right-side-up tool 20A and this would be used with the upwardly facing cross-slides shown at the lower portions of FIG. 4. At the upper portion of FIG. 4 an upside-down cross-slide 21B is shown and this mounts an upside-down tool holder 12B with an upside-down tool 20B. FIGS. 1, 2 and 3 illustrate the tool presetting fixture 11 which may be used with either of these two different types of tool holders 12A or 12B.

The fixture 11 includes a base 30 on which are mounted or carried first, second and third gage surfaces 31, 32 and 33, respectively. The base is provided with T-slots 36 which receive the T-heads 37 of hold-down bolts 38 which extend through apertures in the tool holders 12 and are secured by nuts 39. The T-slots 36 also closely receive a key 40 for precise positioning of the tool holder 12. This same key 40 would be used when the tool holder 12 was transferred from the fixture 11 to the machine tool cross-slide 21.

The general shape of the tool holders 12 may vary from one manufacturer to the next, but often they are as shown in FIG. 5 and they include some form of tool holding pocket 42 to receive the various types of tools 20. A taper gib 43 is provided in the pocket 42 with the gib 43 being adjustable by a screw 44 and the tool 20 being adjustable by a screw 45. This adjusts the position of the tool tip 46. Often the tool holder 12 is double-ended so that a pocket is provided on each end for greater convenience in utilization of the tool holder in the varied conditions encountered in different machine tool setups.

The fixture 11 is so constructed as to have the three gage surfaces 31, 32 and 33 mutually perpendicular. In the preferred embodiment, the base 30 has secured thereto a rear wall 49 and the front surface thereof is the second gage surface 32. A first and a second side wall 51 and 52 are also secured to the base 30 and an inner surface of the side wall 51 provides the third gage surface 33A and the inner surface of the second side wall 52 provides the third gage surface 33B. An arm 53 is pivoted on the first side wall 51 for movement perpendicular to the base 30 and the lower surface of the arm forms the first reference surface 31A. A second arm 54 is pivoted on the second side wall 52 for movement about an axis perpendicular to the base 30, and the upper surface of the arm forms the first gage surface 31B. The first and second gage surfaces 31A and 31B are movable in a common plane parallel to the base 30.

In the tool holders 12A or 12B, machine screws 58 may be tightened to secure the tools 20A or 20B in the tool holding pockets 42. Preferably the tool holders 12A and 12B are modified to have tapped apertures receiving bolts 59 parallel to the base, secured by lock nuts 60, and the ends of these bolts 59 may engage the gage surface 32. The rear wall 49 is provided with a tapped aperture 61 into which is threaded an adjusting screw 62. This screw may abut the rear surface of the tool holder 12A or 12B for adjustably positioning it along the T-slots 36. The rear wall 49 also carries gage means in the form of micrometers 64 and 65. These micrometers have an adjustable stem 66 and 67, respectively, the position of which is indicated by a digital readout 68 to indicate the position of the tip of the adjustable stem. As best shown in FIG. 1, this may abut the tool tip 46 to gage the position thereof. The micrometers 64 and 65 are mounted to be horizontally slidable in the rear wall 49 by means of a slide block 69 sliding in an elongated horizontal slot 70.

Figure 9:
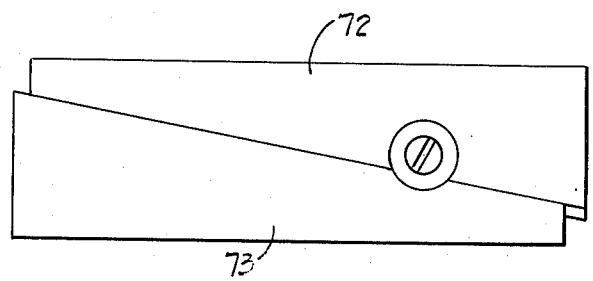
FIG. 9 is a plan view of a pair of adjustable parallelogram gage blocks.

A dimension 71 between the tool tip 46 and the third gage surface 33A may be gaged, for example, by a micrometer similar to micrometer 64 and 65, or may be gaged by other means, such as by an inside caliper or parallelogram gage blocks 72 and 73 such as shown in FIG. 9.

Figure 6:
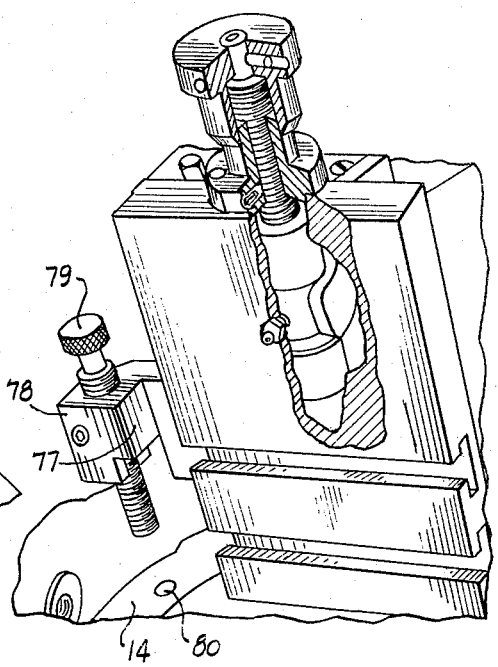
FIG. 6 is a perspective view of an upside-down cross-slide of a machine tool having a reference surface.
Figure 7:
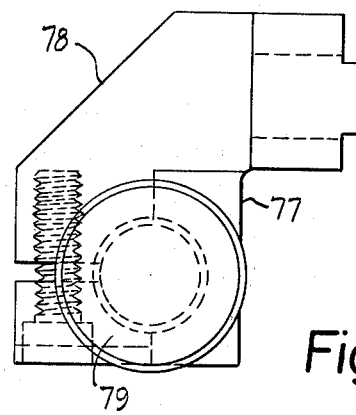
FIG. 7 is an end elevational view of a reference surface block used on FIG. 6.
Figure 8:
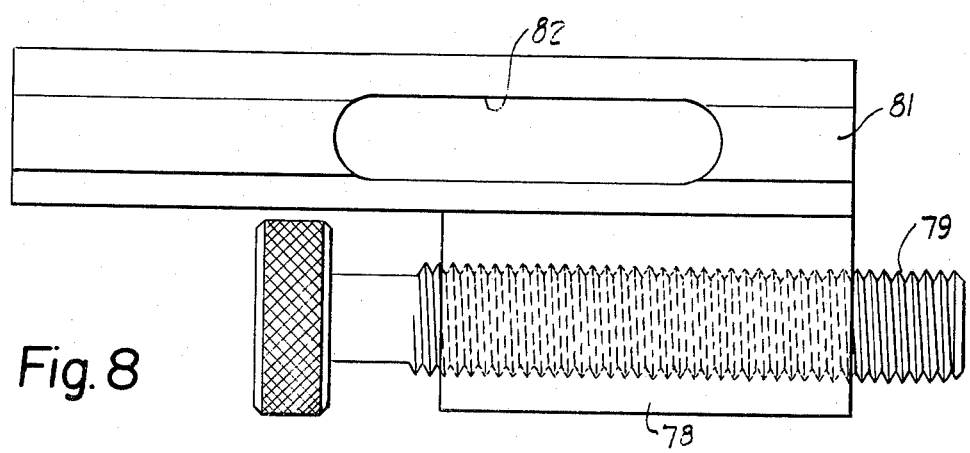
FIG. 8 is a front elevational view of the reference surface block of FIG. 7.

The machine tool 13 usually has some form of reference surface and, as shown in FIG. 4, the spindle carrier face 16 usually acts as this reference surface, which is perpendicular to the various spindle axes. After proper adjustment in the tool presetting fixture 11, the ends of the bolts 59 are adapted to engage this reference surface 16. In some machine tools, this spindle carrier face 16 may not be suitably available, at least not for large radius cuts on the various workpieces 17. In such case, a reference surface 77 may be provided, as shown in FIG. 7, directly on each cross-slide 21, and this may be in the same plane as the spindle carrier face 16. To accomplish this, FIGS. 6, 7, and 8 show a modified bracket 78 which is adapted to hold a graduated stop screw 79 which bears against a stop 80 on the periphery of the spindle carrier 14. These are the usual graduated stop screws and stops which cooperate to limit the inwardmost travel of the respective cross-slides to assure cutting of the workpiece by the tool for each indexable position of the spindle carrier 14 to be within dimensional tolerance. The bracket 78 has a tongue and groove connection 81 and a slot 82 accommodates a machine screw for adjusted position of the bracket 78 along the edge of the respective cross-slide 21. When the bracket 78 is mounted on the edge of the cross-slide 21, then this provides the reference surface 77 in the same plane as the spindle carrier face 16 for abutment by the ends of the bolts 59.

Operation

The right-side-up cross-slides 21 on the front of the machine and the upside-down cross-slides on the rear of the machine tool 13 usually require tool holders 12A which present the tools 20A right-side-up to the respective workpieces 17. Similarly, the upside-down cross-slides on the front of the machine and the right-side-up cross-slides on the rear of the machine usually require tool holders 12B which present the tools 20B upside-down to the respective workpieces 17. This is with counterclockwise rotating spindles, as one faces the spindles 15. The tool presetting fixture 11 is adapted to preset the position of the tool tip 46 for either type of tool holder, and to preset three mutually perpendicular dimensions of such tool tips 46. With such presetting of the tool, the tool holder may be quickly mounted and secured by the T-slots of the desired cross-slides ready to make a cut on a workpiece in a new setup, or when it is desired to change a tool in an existing setup should the old tool become dull. Thus, the tool presetting fixture 11 saves considerable down-time when the machine tool 13 is nonproductive.

The tool presetting fixture 11 may be utilized by placing the desired tool holder 12A or 12B on the base 30 with the key 40 in position interengaging the tool holder and the base T-slot 36. Since the key 40 fits with close tolerance in the T-slot, the adjusting screw 62 may conveniently be used to move the tool holder along the T-slots to a position whereat the arms 53 or 54 may be used to gage the centerline height of the tool tip 46. First, there will be described the operation of the fixture 11 in connection with a right-side-up tool holder 12A. In such tool holder, there would be loosely mounted the desired tool 20A, resting on the tapered gib 43. The tool holder 12A would be moved toward the bottom of FIG. 1 until the gage surface 31A of the arm 53 could gage the height of the tool tip 46 relative to the upper surface of the base 30. The nuts 37 would next be temporarily tightened. The screw 44 would be adjusted in or out to adjust the position of the tapered gib 43 to achieve this proper height of the tool tip 46. This assures that the tool tip 46 will be cutting at the centerline of the spindle and workpiece. By this is meant that as the tool tip moves in a line as the cross-slide moves forward, then this line would intersect the axis of the respective spindle. Accordingly, the tool would be cutting at the centerline height of the spindle for proper cutting action.

Preferably, the dimension 71 may next be gaged in the fixture 11. This dimension 71 is the dimension from the tool tip 46 to the third gage surface 33A. Such dimension may be gaged by a micrometer mounted on the side wall 51, such as the micrometer 64 or 65, by inside calipers, or by the parallelogram blocks 72 and 73. Such gaged distance will determine the radius of cut on the workpiece 17 when the tool holder 12A is properly mounted on the desired cross-slide of the machine tool 13. Once this proper dimension 71 is gaged as determined by the adjustable screw 45, then the machine screws 58 may be tightened to secure the tool 20A in this gaged position.

Next, the nuts 39 may be loosened and the tool holder 12A moved along the T-slots 36, by hand or by means of the adjusting screw 62, to a position as gaged by the micrometer 64. Such micrometer may be slid along the elongated slot 70 so that the micrometer stem 66 will abut the side of the tool tip 46. The adjusting screw 62 may be used to help position the tool holder 12A so that the tool tip 46 is in the desired gaged position. When in such position, the nuts 39 may be tightened to make sure that the gaged position will remain. Next, the bolt 59 may be adjusted until the ends thereof engage the second gage surface 32 and then the lock nuts 60 may be tightened. This establishes the ends of the bolts 59 in a proper gaged position relative to the tool tip 46 so that when the tool holder 12A is properly mounted on the respective cross-slide 21 in the machine tool, the end of this bolt 59 may engage the reference surface 16 or 77 to establish the tool tip 46 in the proper desired gaged position. This will establish the desired tool tip cutting length of the workpiece 17.

With these three mutually perpendicular distances preset in the fixture 11, then the nuts 39 may be loosened and the tool holder 12A removed and mounted on the desired cross-slide 21. The key 40 will engage the T-slot 22 on such cross-slide to establish the desired gaged distance 71. The lower surface of the tool holder 12A resting on and being secured to the mounting surface of the cross-slide will assure that the tool tip 46, in its line of movement, will intersect the respective spindle axis. The end of the bolts 59 engaging the reference surface 16 or 77 will establish the desired axial length of the workpiece up to the point of cutting by the tool tip 46.

When the tool holder is an upside-down tool holder 20B, a very similar procedure for establishing the three mutually perpendicular gaged dimensions is followed. In such case, the tool holder 12B will be that as shown at the left portion of FIGS. 1 and 2 with the tool 20B mounted upside-down. The tool tip 46 in that case is then gaged by the upper surface of the arm 54 which is the first gage surface 31B. The micrometer 65 would be used to gage the longitudinal cutting length on the workpiece 17, and the gage surface 33B would be used to determine the dimension 71B between this gage surface 33B and the tool tip 46. This would establish the proper radius of cut on the workpiece.

Preferably the tool tip 46 is gaged by the first reference surface 31A or 31B prior to gaging the distance from the tool tip to the second gage surface 32. This is merely for convenience so that the swinging arms 53 or 54 will be able to reach the tool tip. Since the three gaged dimensions are mutually perpendicular, the setting of one does not disturb the setting of the other, and hence, in many cases the gaging of these three distances may be effected in any order.

Two micrometer gages 64 and 65 have been shown and this is merely for convenience in use, but for economy a single micrometer gage might be used with an elongated slot 70. A micrometer gage may be used in the side wall 51 or 52 should it be desired for use in gaging the distance 71 or 71B. The adjusting bolts 59 may be omitted and, instead, other gage means such as the parallelograms blocks 72 and 73 may be used to be set the tool holder position in accordance with the micrometer setting 64 and 65, and then these parallelogram blocks 72 and 73 used when mounting the tool holder 12 on the machine tool 13. Where the machine tool 13 is one which has a spindle carrier face 16 which is not large enough in diameter so that the end of the bolt 59 will abut such face when the tool holder is mounted on the machine tool, then the reference surface 77 shown in FIGS. 7 and 8 may be utilized. This is accomplished by utilizing the modified bracket 78 mounted on the cross-slide 21 of the machine tool in place of the normal bracket which carries the graduated stop screw 79. This modified bracket 78 not only provides the tapped aperture for the graduated stop screw, but also provides a reference surface 77. Accordingly, when the tool holder 12 is mounted in the tool presetting fixture 11 and three gaged distances are preset for the tool tip 46, then when the tool holder 12 is transferred from the fixture 11 to the machine tool 13, the end of the bolt 59 will engage this reference surface 77 to establish the gaged distance of such tool tip relative to the reference surface of the machine tool, namely, the spindle carrier face 16.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool presetting fixture for cross-slide type tool holders usable on a multiple spindle automatic machine tool, the tool holders each having a tool holding pocket on an end thereof adapted to mount a tool having a tool tip, said fixture comprising in combination:

a base, means to secure to said base any said tool holder for cross-slide type tools, movable element means mounted on said base and having a first gage surface for movement parallel to said base adapted for gaging the spindle centerline height of a tool tip in the tool holding pocket on the tool holder, a wall carried on said base and having a second gage surface perpendicular to said base, said second gage surface adapted for gaging the distance of the tool tip from said second gage surface, and a wall carried on said base and having a third gage surface perpendicular to said base and perpendicular to said second gage surface adapted for gaging the distance from the tip of the tool to said third gage surface to gage for the workpiece cutting radius of the tool tip on a workpiece in the respective machine spindle.

2. A tool presetting fixture as set forth in claim 1, including a slot in said base, and a key interengaging said base slot and a slot in the tool holder to locate the tool holder relative to said third gage surface.

3. A tool presetting fixture as set forth in claim 1, wherein said second-mentioned wall is a side wall secured to said base, and said third gage surface being formed as an inwardly facing surface on said side wall.

4. A tool presetting fixture as set forth in claim 3, wherein said movable element means is mounted on said side wall.

5. A tool presetting fixture as set forth in claim 3, wherein said movable element means includes an arm movably mounted on said side wall, and said first gage surface being a surface on said arm.

6. A tool presetting fixture as set forth in claim 3, wherein said movable element means includes an arm pivotably mounted on said side wall about an axis perpendicular to said base, and said first gage surface being one of an upper and a lower surface on said arm.

7. A tool presetting fixture as set forth in claim 1, a wall on said base having a fourth gage surface parallel to said third gage surface and adapted for gaging the distance from the tip of the tool to said fourth gage surface to gage for the workpiece cutting radius of the tool tip on a workpiece in the respective machine spindle with the tool mounted upside-down in the tool holder.

8. A tool presetting fixture as set forth in claim 1, wherein said second-mentioned wall is a first side wall secured on said base, said third gage surface being formed as an inwardly facing surface on said first side wall, a second side wall secured on said base, and a fourth gage surface being an inwardly facing surface on said second side wall and parallel to said third gage surface adapted for gaging the distance from the tip of the tool to said fourth gage surface to gage for the workpiece cutting radius of the tool tip on a workpiece in the respective machine spindle with the tool mounted upside-down in the tool holder.

9. A tool presetting fixture as set forth in claim 8, wherein said movable element means includes an arm pivoted on said second side wall, and said first gage surface being an upper surface on said arm.

10. A tool presetting fixture as set forth in claim 1, including said first-mentioned wall being secured on said base, and said second gage surface being an inwardly facing surface on said wall.

11. A tool presetting fixture as set forth in claim 1, including gage means mounted on said fixture to gage the distance from said second gage surface to the tool tip.

12. A tool presetting fixture as set forth in claim 11, including means movably mounting said gage means on said first mentioned wall.

13. A tool presetting fixture as set forth in claim 11, including a slot in said first mentioned wall, and a slide block slidable in said slot and carrying said gage means.

14. A tool presetting fixture as set forth in claim 11, wherein said gage means includes first and second micrometer gages.

15. A tool presetting fixture as set forth in claim 1, wherein said second gage surface is adapted for gaging the longitudinal length of a workpiece to be cut by the tool tip.

* * * * *